(12) United States Patent
Lamm

(10) Patent No.: US 6,311,650 B1
(45) Date of Patent: Nov. 6, 2001

(54) VEHICLE HAVING A DRIVING INTERNAL-COMBUSTION ENGINE AND HAVING A FUEL CELL SYSTEM FOR THE POWER SUPPLY TO ELECTRIC CONSUMING DEVICES OF THE VEHICLE AND METHOD FOR OPERATING SUCH A VEHICLE

(75) Inventor: Arnold Lamm, Oberelchingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/597,713

(22) Filed: Jun. 19, 2000

(30) Foreign Application Priority Data

Jun. 19, 1999 (DE) .............................................. 199 28 102

(51) Int. Cl.⁷ .............................. F02B 43/00; H01M 8/06
(52) U.S. Cl. ........................... 123/3; 123/25 R; 123/1 A; 123/536; 123/543; 429/19
(58) Field of Search .............................. 123/1 A, 3, 25 R, 123/25 B, 25 D, 25 E, 25 F, 536, 554, 543, DIG. 12; 429/13, 17, 19, 20, 22, 23, 24

(56) References Cited

U.S. PATENT DOCUMENTS

| | | | |
|---|---|---|---|
| 3,655,448 | * | 4/1972 | Setzer ..................................... 429/20 |
| 3,918,412 | * | 11/1975 | Lindstrom ................................ 123/3 |
| 4,444,158 | * | 4/1984 | Yoon ..................................... 123/1 A |
| 4,522,894 | * | 6/1985 | Hwang et al. ......................... 429/17 |
| 4,539,267 | * | 9/1985 | Sederquist ............................... 429/17 |
| 5,780,179 | * | 7/1998 | Okamoto ................................ 429/20 |
| 5,858,568 | * | 1/1999 | Hsu et al. ............................... 429/13 |
| 5,958,614 | * | 9/1999 | Takei et al. ............................ 429/26 |
| 6,077,620 | * | 6/2000 | Pettit ..................................... 429/26 |
| 6,156,084 | * | 12/2000 | Bonville, Jr. et al. .................. 48/61 |
| 6,210,822 | * | 4/2001 | Abersfelder et al. .................. 429/19 |

FOREIGN PATENT DOCUMENTS

| | | |
|---|---|---|
| 195 23 109 A1 | 1/1997 | (DE) . |
| 197 03 171 A1 | 8/1998 | (DE) . |

\* cited by examiner

Primary Examiner—Noah P. Kamen
Assistant Examiner—Hai Huynh

(57) ABSTRACT

In a method of operating a vehicle having a driving internal-combustion engine and a fuel cell system which has a reforming reactor with a shift reactor connected on the output side, in a cold-starting phase, hydrogen-containing gas from the electrically warmed-up reforming reactor is fed together with the fuel to the internal-combustion engine for reducing the pollutant emission. After the warming-up of the shift reactor, the gas is supplied to the fuel cell whose anode exhaust gas together with the fuel is supplied to the internal-combustion engine for reducing pollutants.

11 Claims, 1 Drawing Sheet

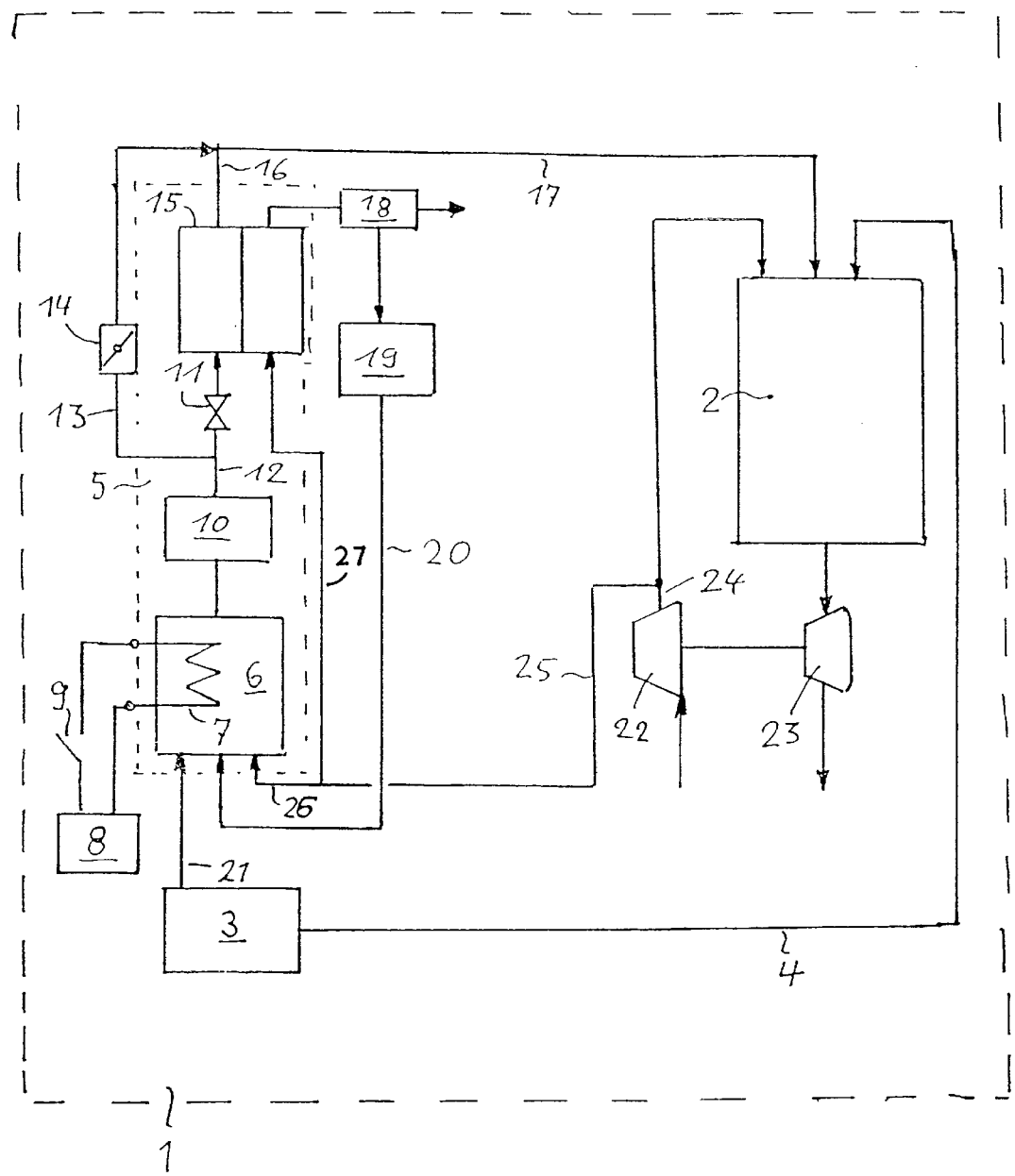

VEHICLE HAVING A DRIVING INTERNAL-COMBUSTION ENGINE AND HAVING A FUEL CELL SYSTEM FOR THE POWER SUPPLY TO ELECTRIC CONSUMING DEVICES OF THE VEHICLE AND METHOD FOR OPERATING SUCH A VEHICLE

BACKGROUND AND SUMMARY OF THE INVENTION

This application claims the priority of German patent document 199 28 102.5, filed Jun. 19, 1999, the disclosure of which is expressly incorporated by reference herein.

The invention relates to a vehicle having an internal-combustion engine, a starter battery or buffer battery and a fuel cell system to supply electric consuming devices of the vehicle, and to a method for operating such a vehicle.

In a known vehicle which is driven by an internal-combustion engine, a fuel cell system supplies energy to the electric consuming devices of the internal-combustion engine, and can be activated independently of the operation of the internal-combustion engine. The fuel cell system also supplies the internal-combustion engine with electric energy. A battery connected with the fuel cell system outputs current when the internal-combustion engine is started, and covers brief peak loads (German Patent Document DE 197 03 171 A1). In this vehicle, the fuel cell is supplied with hydrogen, either from a tank or indirectly by reforming liquid or gaseous fuels, by way of a controlled throttle. Reaction air is supplied to the fuel cell by way of a compressor, with a throttle connected on the output side.

A motor vehicle driven by an internal-combustion engine is also known which, instead of a dynamo, has a fuel cell system that provides the electric energy for operating consuming devices independently of the rotational speed of the internal-combustion engine. In this motor vehicle, the internal-combustion engine is supplied with liquid fuel. Hydrogen is separated from the liquid fuel for the operation of the fuel cell system. Only a portion of the hydrogen is separated from the fuel. The remaining fuel constituents are further utilized in the internal-combustion engine; that is, gaseous constituents are feed to the internal-combustion engine directly or by way of a mixture formation device and liquid constituents are returned into the fuel tank. An intermediate $H_2$ storage device provided in the supply line supplies the fuel cell at the time of the starting of the vehicle. A battery is provided for starting the fuel cell system and/or a separating device for separating the hydrogen from the liquid fuel. (German Patent Document DE 195 23 109 A1)

Another fuel cell system which has been suggested for use with an internal-combustion engine supplied with liquid fuel from a tank, generates electric energy during the operation of the internal-combustion engine, at least for the electric devices provided for the operation of the internal-combustion engine, and is connected with a buffer battery. In this system, exhaust gases or heating gases, which are generated as the result of the combustion of the liquid fuel, are guided through at least one heat exchanger in the fuel cell system until an operating temperature sufficient for operation of the fuel cell system is reached. (German Patent Document 199 13 795.1)

Finally, a vehicle has also been suggested which is propelled by an internal-combustion engine drive and by a fuel cell drive, with liquid fuel being used to supply both such drives. The internal-combustion engine drive is used to start the vehicle, and to permit its immediate movement thereafter, as well as to heat the fuel cell system to an operating temperature. The fuel cell is started when it reaches the operating temperature, and thereafter an electric drive motor, (fed by the fuel cell system) generates torque for movement of the vehicle, either alone or together with the internal-combustion engine. (German Patent Document 199 13 794.3)

Due to an increase in the number of electric consuming devices in trucks and passenger cars, difficulties arise when generators are used for the power supply. At approximately 15%, the efficiency of dynamos is unfavorable. Moreover, when the vehicle is stopped, the battery can only be loaded briefly in order to avoid impairing its starting capacity. By using fuel cells, which have a significantly higher efficiency than generators, and can be operated independently of the operation of the internal-combustion engine, the power supply while the vehicle is stopped can be improved, even for vehicles with several consuming devices.

In the future, pollutant emissions of motor vehicles must also still be drastically reduced. The reduction of, for example, nitrogen oxides in exhaust gases of conventional internal-combustion engines, such as diesel engines, is performed by means of continuous exhaust gas catalysts which have a poor cold-starting behavior. As the result, 90% of the nitrogen oxides produced during a driving cycle are caused by the poor cold-starting behavior of the currently used exhaust gas catalysts.

One object of the invention is to provide a vehicle that is driven by an internal-combustion engine, and has a high-capacity and high-efficiency power supply unit.

Another object of the invention is to provide such a vehicle in which the pollutant emission is greatly reduced in a relatively simple manner, including in the cold starting phase.

Finally, still another object of the invention is to provide a method for operating such a vehicle.

These and other objects and advantages are achieved by the vehicle according to the invention, in which the fuel cell system has an electrically heatable, autothermal reforming reactor, to which air and water can be fed by assemblies in the vehicle and hydrocarbons can be fed from the fuel tank, for partial oxidation and vapor reforming. A shift reactor is connected behind the reforming reactor for reducing the carbon monoxide fraction On its output side, the shift reactor is connected on the one hand to the anode-side input of a fuel cell, via a valve which is penetrable after the operating temperature has been reached in the shift reactor, and is connected on the other hand to the driving internal-combustion engine, via a bypass of the fuel cell, which can be blocked when the operating temperature has been reached in the shift reactor. When the reforming reactor is heated electrically, hydrogen-containing gas, which will be available within a very short time, is burned in the internal-combustion engine with the hydrocarbons delivered from the fuel tank. Pollutant emissions are reduced significantly by the metered addition of hydrogen during the initial operating minutes of the internal-combustion engine, because a cleaner combustion of the hydrocarbons takes place as the result of the hydrogen.

"Autothermal" means in this case that the heat required for the process is provided in the educt itself by the partial oxidation. Heat will be supplied by electric heating only when the engine is started. The hydrogen-containing gas flows through the shift reactor and, in the process, heats it to its operating temperature. When the operating temperature in the shift reactor has been reached, the hydrogen-containing gas is guided from the shift reactor into the fuel cell by opening the valve connected in front of the fuel cell and blocking the bypass. The hydrogen will then be oxidized at the anode of the fuel cell and the oxygen will be reduced at the cathode, so that the fuel cell supplies electric power for the electric consuming devices of the motor vehicle.

A pollutant reduction in the exhaust gases is achieved by the utilization of the hydrogen generated for the fuel cell during a time period in which the fuel cell has not yet started its operation because of a warm-up phase. It is unnecessary to provide a hydrogen tank, which is hard to integrate in the vehicle because of its volume and weight, for reducing the pollutants.

Because of the intensive use of energy for which the battery would have to be designed, the generation of hydrogen by electrolysis is not practical.

In a preferred embodiment, the residual anode gas output of the fuel cell is connected with a pipe extending to the driving internal-combustion engine, and the bypass also leads into the same pipe. In this embodiment, the portion of the hydrogen not consumed in the fuel cell, and other burnable constituents in the anode exhaust gas, are burned in the engine. Also after the cold starting phase, hydrogen is still supplied to the fuel taken from the tank, whereby, also when the exhaust gas catalyst has reached its operating temperature, a greater pollutant reduction is achieved in the exhaust gases in comparison to vehicles which do not have the system according to the invention. The cathode-side output of the fuel cell is preferably connected with a water tank by way of a separator; and the reforming reactor is also connected to the water tank. In this case, water required for the reforming process is recovered from the cathode exhaust gas.

In particular, an air supply input of the reforming reactor is connected with the air supply device of the internal-combustion engine. The air for the internal-combustion engine can be generated, for example, by a compressor which is connected on the output side with the internal-combustion engine or the device for the mixture formation and the reforming reactor.

In another preferred embodiment, the air ratio of the reforming process is set to be less than 1, and the ratio of water to carbon is greater than 0. The hydrogen is generated by means of an understoichiometric combustion. The air ratios are preferably in the range of from 0.2 to 0.6, 0.3 being optimal.

The objects of the invention are also achieved by a method for operating a vehicle having an internal-combustion engine, a starter battery or a buffer battery and a fuel cell system for supplying energy to electric consuming devices of the vehicle equipped. According to the invention, after the driving internal-combustion engine is started, a hydrogen-containing gas is generated from the fed educts air, water and a fuel of hydrocarbons in an autothermal reforming reactor electrically which is heated to the operating temperature. The hydrogen containing gas is supplied to the internal-combustion engine together with the hydrocarbon fuel by way of a shift reactor. After the shift reactor is heated to its operating temperature for reducing the carbon monoxide fraction in the hydrogen-containing gas, the hydrogen-containing gas is no longer fed directly to the internal-combustion engine. Rather, it is fed to a fuel cell whose anode exhaust gases, together with the hydrocarbon fuel, are supplied to the internal-combustion engine.

The reforming reactor is electrically heated to its operating temperature in a few seconds; this, the hydrogen-containing gas is available for admixture with the fuels virtually immediately after the internal-combustion engine is started. Because of the resulting improved combustion in the engine, the pollutant emission is significantly reduced, even in the cold starting phase. After the fuel cell has started its operation, the anode exhaust gas, which still contains hydrogen is supplied to the internal-combustion engine together with the fuel, to reduce pollutant emissions. By reducing pollutant emissions, it is possible to design the internal-combustion engine for higher combustion temperatures, which increases the efficiency of the engine while maintaining nitrogen oxide emissions (which are greater at higher combustion temperatures) at acceptable values. Simultaneously, the fuel cell also supplies the current for a larger number of consuming devices which may have a high power requirement.

Water for the reforming reactor is preferably obtained by separation from the cathode exhaust gas and/or from the exhaust gases of the internal-combustion engine, so that it is no longer necessary Lo carry a large water supply in the vehicle. Moreover, it is expedient for the air for the reforming reactor and the fuel cell to be branched off from the air flow for the driving internal-combustion engine, eliminating the need for separate units for compressing the air required by the reforming reactor and the fuel cell. In particular, the hydrogen-containing gas is generated in the reforming reactor by the partial oxidation and vapor reforming with an understoichiometric combustion at an air ratio of less than 1, the ratio of water to carbon in the fuel being set to be more than zero in order to avoid a soot formation.

In another advantageous embodiment, liquid fuel is used to supply the reforming reactor and the internal-combustion engine. In the case of diesel oil, the ratio of water to carbon is set to a value more than 1.

Other objects, advantages and novel features of the present invention will become apparent from the following detailed description of the invention when considered in conjunction with the accompanying drawings.

BRIEF DESCRIPTION OF THE DRAWINGS

The FIGURE of the drawing is a basic diagram of a vehicle having a driving internal-combustion engine and a fuel cell system according to the invention.

DETAILED DESCRIPTION OF THE DRAWINGS

The schematically illustrated vehicle 1 is driven by an internal-combustion engine 2. A fuel tank 3 supplies liquid fuel to the internal-combustion engine 2 via a fuel pipe 4. (For simplicity, the fuel pump and the devices for the mixture formation on the internal-combustion engine 2 are not shown.) A fuel cell system 5 which supplies power to the electric consuming devices of the vehicle 1 contains an autothermal reforming reactor 6, in which vapor reforming and a superimposed partial oxidation take place. The reforming reactor 6 has an electric heating circuit 7, which can be applied to a starter battery or buffer battery 8 by means of a switch 9.

A shift reactor 10 connected behind the reforming reactor 6 oxidizes CO generated in the reforming reactor 6. The output of the shift reactor 10 is connected with a valve 11 by way of a pipe 12, from which a bypass 13 branches off, in which a shut-off valve or slide is arranged. The valve 11 is connected with the anode-side input of a PEM fuel cell 15. The anode-side output 16 of the fuel cell 15, is combined with the bypass 13 to form a pipe 17 which extends to the internal-combustion engine 2. The cathode-side output of the fuel cell 15 is connected with a separator 18 which separates water from the cathode exhaust gas and supplies it to water storage device 19. The water storage device 19 is connected by way of a pipe 20 with the reforming reactor 6. By way of another pipe 21, the fuel tank 3 is connected with the reforming reactor 6.

A compressor 22, which is driven by an exhaust gas turbocharger 23, supplies the air required by the internal-combustion engine 2, via a pipe 24. A pipe 25, which branches off from the pipe 24 between the compressor 22 and the internal-combustion engine 2, supplies air to the reforming reactor 6 by way of a branch 26 and to the cathode side of the fuel cell 15 by way of a branch 27.

At the starting of the internal-combustion engine 2, the switch 9 is closed. The reforming reactor 6 receives air via the pipe 25 and the branch-off 26, liquid hydrocarbon fuel from the fuel tank 3 by means of a fuel pump (not shown) and water from the water storage tank 19 via a pump (not shown). In the autothermal, essentially adiabatically operating, reforming reactor 6, a gas with the constituents $H_2$, $CO$, $CO_2$, $CH_4$ and $H_2O$ as well as the inert gas $N_2$ is generated from the educts water, air and hydrocarbons, by means of a partial oxidation and vapor reforming.

Furthermore, $SO_2$ and $COS$ are to be expected in the case of sulfurous fuels. As a result of the electric preheating, the reforming reactor 6 starts to operate as early as after 1 to 2 seconds. Because the reforming reactor 6 generates the required heat itself, the electric heater is then switched off. Product gas from the reforming reactor 6 passes through the shift reactor 10 to the bypass 13, which is open, while the valve 11 is closed. The hydrogen-containing gas therefore arrives by way of the pipe 17 in the internal-combustion engine 2 and improves the thermal combustion of the fuel. As a result, pollutant emissions of the internal-combustion engine are significantly reduced during the cold starting phase in which known exhaust gas catalysts do not yet perform effectively.

When flowing through the shift reactor 10, the gas from the reforming reactor 6 heats the shift reactor 10 to its operating temperature in approximately 1 to 2 minutes. After the reaching of the operating temperature (monitored by sensors, not shown), the shift reactor 10 starts to operate. The valve 11 is then opened up and the shut-off valve 14 is closed, so that the hydrogen-containing gas flows out of the shift reactor 10 into the fuel cell 15, to which simultaneously air is supplied by way of the branch-off 26. The fuel cell starts to operate and supplies the electric consuming devices with current. The hydrogen-containing residual anode gas flows through the pipes 16, 17 to the internal-combustion engine, and improves the combustion of the hydrocarbons, whereby pollutant emissions are also reduced after the cold starting phase.

For generating hydrogen in the reforming reactor, an understoichiometric fuel combustion is set, with air ratios in the range of less than 1, particularly between 0.2 and 0.6, with 0.3 being optimal. The S/C ratio, defined as the ratio of water to carbon, is to be above 0. Particularly in the case of diesel oil as the fuel, S/C ratios of more than 1 are to be desirable, in order to avoid soot.

The characteristics and the significant advantage of the invention are the following:

a) A fuel cell system (5) having a carbon reformer (6) replaces the generator (increasing the efficiency) and contributes to the lowering of the pollutant emission of the conventional internal-combustion engine (fuel cell/ internal-combustion engine tandem arrangement).

b) The residual anode gas of the fuel cell is used to improve the exhaust gas ratios in the internal-combustion engine.

c) Hydrogen is generated by preheating by means of a starter battery (8) in an autothermal reforming process as early as after a few seconds.

d) The reforming reactor (6) is a multi-fuel-type reactor (gasoline/diesel).

e) The evaporation of water and gasoline is integrated in the reforming reactor (6).

f) The autothermal reforming process is carried out by means of the educts water, air and hydrocarbons at an air ratio of less than 1 and a water excess of more than 1.

g) The water for the process is recovered from the engine exhaust gas and/or the cathode exhaust gas of the fuel cell (15).

h) The air for the reforming reactor (6) and the fuel cell is branched off from the air supply for the internal-combustion engine (2).

i) The hydrocarbons are taken from the fuel tank (3).

j) After the electric warm-up phase of the reforming reactor, the power supply can be switched off because the operating temperature is maintained by the process.

A conflict exists between the goals of efficiency in an internal-combustion engine (which generally requires a high combustion temperature) and the reduction of nitrogen oxide emissions (which generally requires a low combustion temperature). As a result of the invention, pollutant emissions can be reduced in the cold starting phase as well as during normal operation with a heated engine, by means of a gas generating system outside the engine, which is simultaneously used to generate electric current for operating the vehicle. The engine can therefore be adapted to a higher efficiency at higher combustion temperatures while unacceptable emissions are avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having an internal-combustion engine for propulsion, a fuel cell system for supplying power to electric consuming devices of the vehicle, and a starter or buffer battery, wherein the fuel cell system comprises:

an electrically heatable, autothermal reforming reactor which is coupled to receive air and water from systems on board the vehicle and hydrocarbons from the fuel tank, for partial oxidation and vapor reforming;

a shift reactor connected to an output of the reforming reactor for reducing a carbon monoxide fraction of gas generated in the reforming reactor; and a fuel cell;

a valve connected between an output of the shift reactor and an anode input of the fuel cell, which valve is controllable to be open after an operating temperature has been reached in the shift reactor; and a bypass connected between the output of the shift reactor and the internal-combustion engine, which bypass can be blocked when the operating temperature has been reached in the shift reactor.

2. The vehicle according to claim 1, wherein the residual anode gas output of the fuel cell is connected with a pipe extending to the driving internal-combustion engine, the bypass also leading into this pipe.

3. The vehicle according to claim 1, wherein the cathode-side output of the fuel cell is connected by way of a separator with a water tank which is connected to supply water to the reforming reactor.

4. The vehicle according to claim 1, wherein an air supply input of the reforming reactor is connected with an air supply device of the internal-combustion engine.

5. The vehicle according to claim 1, wherein the air ratio of the reforming process is set to less than 1 and the ratio of water to carbon is more than 0.

6. A method for operating a vehicle having an internal-combustion engine for propulsion, a fuel cell system for supplying power to electric consuming devices of the vehicle, and a starter or buffer battery, the fuel cell system including a fuel cell having an anode side output connected to a fuel supply input of the internal-combustion engine, an electrically heatable autothermal reforming reactor for generating a hydrogen containing gas, and a shift reactor connected to an output of the reforming reactor for reducing a carbon monoxide fraction of the hydrogen containing gas, an output of the shift reactor being selectively connectable to an anode gas input of the fuel cell and to a bypass line which connects to said fuel supply input of the internal-combustion engine, said method comprising:

upon starting of the internal-combustion engine, heating the reforming reactor to an operating temperature, thereof;

said reforming reactor generating hydrogen-containing gas from fed educts air and water, and a fuel of hydrocarbons;

initially supplying a gas output of the shift reactor via the bypass to the internal-combustion engine together with hydrocarbon fuel until the shift reactor reaches an operating temperature thereof; and after the shift reactor reaches its operating temperature, discontinuing supplying the hydrogen-containing gas to the driving internal-combustion engine, and supplying said hydrogen containing gas instead to the fuel cell whose anode exhaust gases, together with the hydrocarbon fuel, are supplied to the driving internal-combustion engine.

7. The method according to claim 6, wherein water for the reforming reactor is obtained by separation from one of cathode exhaust gas and internal-combustion engine exhaust gases.

8. The method according to claim 6, wherein the air for the reforming reactor and the fuel cell is branched off from an air flow for the internal-combustion engine.

9. The method according to claim 6, wherein the hydrogen-containing gas is generated in the reforming reactor by the partial oxidation and vapor reforming with an understoichiometric combustion, at an air ratio of less than 1, the ratio of water to carbon in the hydrocarbons being set to a value greater than zero by means of supplied flows of water and of hydrocarbon.

10. The method according to claim 9, wherein the air ratio is in the range of from 0.2 to 0.6.

11. The method according to claim 9, wherein diesel oil is the fuel; and the ratio of water to carbon is greater than 2.

\* \* \* \* \*